United States Patent [19]

Reinhardt et al.

[11] 4,151,076
[45] Apr. 24, 1979

[54] METHOD OF ELIMINATING THE INFLUENCE OF SURFACTANTS ON THE SEPARATION PROPERTIES IN LIQUID EXTRACTION SYSTEMS

[75] Inventors: Hans Reinhardt, Västra Frölunda; Bengt T. Tröeng, Vålberg, both of Sweden

[73] Assignee: Svenska Rayon Aktiebolaget, Sweden

[21] Appl. No.: 896,190

[22] Filed: Apr. 14, 1978

[30] Foreign Application Priority Data

Apr. 15, 1977 [SE] Sweden .............................. 77043578

[51] Int. Cl.² ............................................. B01D 11/04
[52] U.S. Cl. ......................................... 210/21; 210/40; 210/49
[58] Field of Search ....................... 210/21, 40, 43, 49, 210/511

[56] References Cited

U.S. PATENT DOCUMENTS

| | | | |
|---|---|---|---|
| 3,247,104 | 4/1966 | Sako et al. | 210/21 |
| 3,694,355 | 9/1972 | Visser et al. | 210/21 |
| 3,905,901 | 9/1975 | Tribellini | 210/40 X |
| 3,996,140 | 12/1976 | Josefsson et al. | 210/21 X |
| 4,061,564 | 12/1977 | Schepper et al. | 210/21 |

*Primary Examiner*—John Adee
*Attorney, Agent, or Firm*—Burns, Doane, Swecker & Mathis

[57] ABSTRACT

The invention relates to a method wherein dissolved materials are removed from an aqueous solution by means of a liquid extraction comprising an extraction step and a re-extraction step, the essential features of the method being that the extraction step is performed in the presence of surfactants and that the surfactants are removed in connection with the re-extraction step.

6 Claims, 1 Drawing Figure

U.S. Patent
Apr. 24, 1979
4,151,076
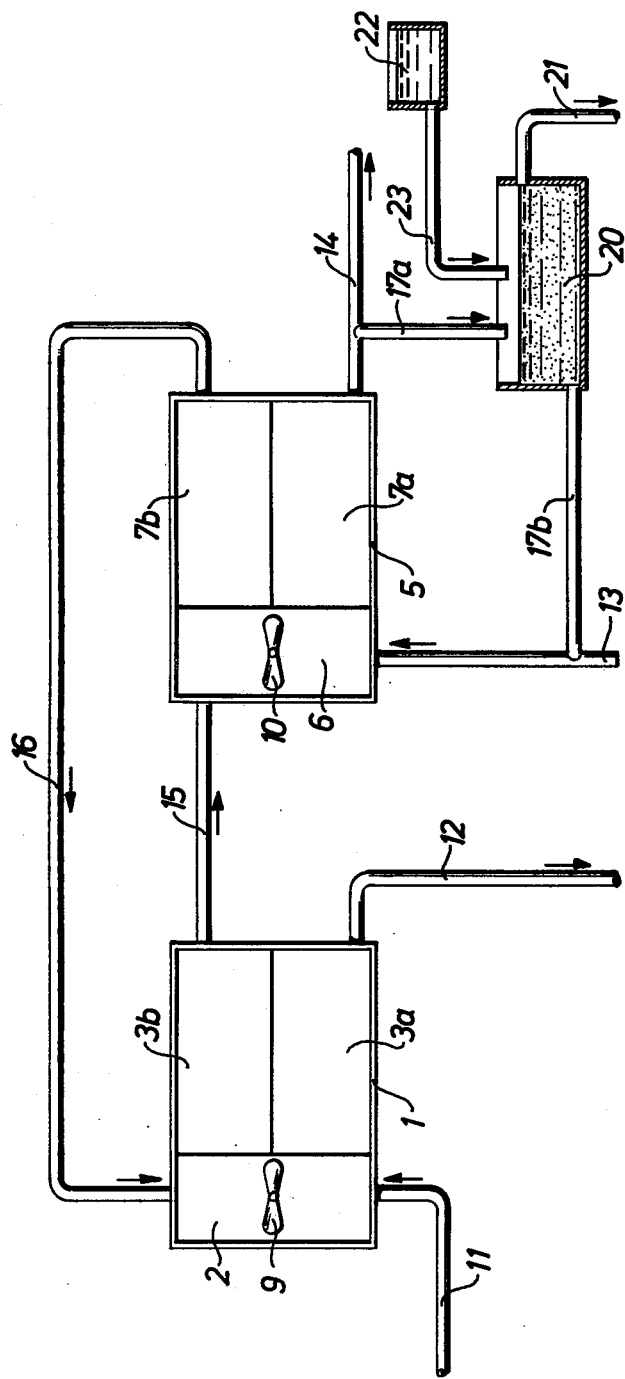

METHOD OF ELIMINATING THE INFLUENCE OF SURFACTANTS ON THE SEPARATION PROPERTIES IN LIQUID EXTRACTION SYSTEMS

The present invention relates to a method of eliminating the influence of surface-active agents, surfactants, on the separation properties in liquid extraction systems. By liquid extraction is meant any process wherein an aqueous feed solution, containing dissolved inorganic material, e.g. metal salts, and dissolved organic material, e.g. surfactants, is contacted with an organic solution, having low solubility in water and wherein the materials are transferred from the aqueous solution into the organic solution. More specifically the invention relates to a method, which comprises contacting in at least one extraction step, the metal ion-containing aqueous feed solution, which also contains dissolved surfactants and often also small solid particles, prohibited to agglomerate by the presence of the surfactants, with an organic solution so as to cause an extraction of the metal ions as well as of the surfactants into the organic solution, and then contacting in at least one re-extraction step, the organic solution, which contains extracted metal ions and surfactants, with an aqueous washing solution so as to transfer the metal ions and the surfactants from the organic solution into the washing solution to the formation of an aqueous product solution, which is partially recycled as washing solution, and an organic solution, which is depleted of metal ions and surfactants and which is recycled to the extraction step, and removing the surfactants from the washing or product solutions by adsorption on a solid material, by precipitation or by destruction.

In one type of liquid extraction the dissolved matter is transferred into the organic solution due to its higher solubility in the organic solution, than in the aqueous solution. In another type of liquid extraction the organic solution contains a reagent wich forms with the matter dissolved in the water, a chemical compound that is more soluble in the organic solution. As an example of last-mentioned type of liquid extraction it could be mentioned that zinc ions may be removed from an aqueous solution by contacting the aqueous solution with a solution of di(2-ethylhexyl)phosphoric acid in kerosine. Then, if contacting the zinc ion-containing kerosine solution with an aqueous solution of sulphuric acid, the metal organic compound is split and the zinc ions are transferred to the sulphuric acid solution, from which zinc can be recovered. This type of liquid extraction is often selective, i.e. by proper choice of reagent one single ion species can be extracted from an aqueous solution containing several ion species. The present invention is preferably applied to last-mentioned type of liquid extraction.

Furthermore, the aqueous feed solution, from which extractable dissolved matter is to be extracted, contains contaminants in the form of small solid particles which are very difficult to remove in any conventional way, e.g. through filtration or centrifugal separation. The particles may comprise various materials. In an aqueous feed solution obtained by an acid or alkali leaching of a metal-containing mineral, the particles can comprise for instance metal oxides, metal sulfides or constituents of the gangue which enclosed or was contained in the mineral. If the aqueous feed solution is derived from a process wherein organic matter was treated, the particles may be of an organic nature.

In the liquid extraction those solid particles may cause trouble through accumulation in the interface between the liquid phases. A voluminous precipitation, a so called crud, is formed. The mechanism seems to be that organic solution is adsorbed on the surface of the solid particles, said particles being flocculated together and accumulated at the interface. The precipitation may be especially difficult at the type of liquid extraction wherein the organic solution contains a reagent. This depends on the fact that said reagent is generally an organic compound that may work as a surface-active agent, a tenside. A slight amount of crud may be accepted, as it can be withdrawn from the interface between the liquid phases. However, a larger amount of crud leads to a stopping up of the extraction apparatus. However, already in the case when the amount of crud is slight, i.e. when the extraction can be performed by withdrawal of crud from the interface, said withdrawal of crud in addition to an adverse effect on the phase separation, generally means economic losses through the fact that large amounts of expensive reagents are lost.

It has, however, unexpectedly turned out that the voluminous precipitation can be avoided in the interface between the organic solution and the aqueous solution in the extraction step by a prohibition of an agglomeration of the solid particles in the feed solution by means of a hydrophilic surfactant having affinity to the solid particles. Thus, in spite of the intimate contact between the organic solution and the aqueous solution in the extraction step, there is no flocculation of the solid particles, but said particles will be maintained in a dispersed state in the aqueous solution and removed from the extraction apparatus contained in said solution.

It is understood that the addition of surfactant need not necessarily be made in association with the liquid extraction plant but can be made in previous process steps, e.g. at the leaching of metal-containing minerals to leaching tanks or filtering tanks, or in the manufacture of rayon to the viscose or the spinning bath.

The purpose of the present invention is to accomplish a method which can be utilized for liquid extraction when the incoming aqueous feed solution contains extractable, hydrophilic surfactants, added in order to prevent an agglomeration of solid particles. According to the invention this can be made without any precipitation or emulgation problems by performing the extraction in the presence of the surfactants but removing them in connection with the re-extraction step, at least from that part of the product solution which is recycled as a washing solution.

Although in the present case the surfactants are of such a nature that the hydrophilic properties are predominant over the hydrophobic ones, a certain proportion thereof is transferred i.e. extracted, into the organic solution. Said transfer may also be effected by chemical means, e.g. through the fact that a cationic surfactant formes a complex with an anionic reagent in the organic solution or vice versa. From the organic extraction solution the surfactant will then in the re-extraction step partly be washed away from the organic solution to the washing solution, partly be recycled to the extraction step through the recycled organic solution. However, the transfer processes can only be effected to a certain concentration in the solutions referred to, and above said concentration precipitation or emulgation problems will occur in the extraction or re-extraction steps. However, in accordance with the invention this is overcome by removing surfactants at least from that part of the product solution which is recycled as the washing solution.

Preferably the surfactants are removed by contacting them with an adsorption agent, a precipitation agent or a flocculation agent, whereupon the adsorbed, precipitated or flocculated substances are removed in a manner known per se. According to another method the surfactants are removed by a destruction of the same. The last-mentioned method is especially preferable in the cases when the aqueous washing solution used in the re-extraction step can be utilized at the same time to decompose the surfactants. Thus, for instance, an anionically surface-active agent can be decomposed by means of a strong acid solution.

Of the above-mentioned methods the use of a solid floc, e.g. an anionically active floc for the flocculation of a cationically surface-active agent, is especially preferable since such a flocculation is very simple and is process-technically easily performed contrary to for example an adsorption of a cationically surface-active agent on activated carbon, which adsorption is more expensive and apparatus-technically more complicated.

For the sake of simplicity, the surfactants used in accordance with the invention have been referred to above as hydrophilic surfactants. However, as is well known, the hydrophilic and hydrophobic properties respectively of substances may vary depending on the presence of other substances in the system. Thus, theoretically a surfactant might show mainly hydrophobic properties if it were free in the solution, while the hydrophilic properties might be predominating when adsorbed on the solid substance present. However, in the present case it is understood that the small solid particles are hydrophilic or that they work in a hydrophilic manner in the liquid extraction system.

The expression "affinity to the solid particles" with reference to the addition of surfactants in order to prevent an agglomeration of the solid particles, means that, if possible, the surfactants are selected in dependency of the chemical nature of the solid particles. Said particles can be of very various types, e.g. from oxide, sulfide or other inorganic materials in leaching solutions from the leaching of metal-containing minerals by acids or alkalies, from hemi-cellulose or cellulose of various degrees of degradation, colloidal surphur, zinc sulfide and "soil" in waste waters from the manufacture of rayon and from carbohydrates, cellulose, bacteria and inorganic materials in waste solutions from the manufacture of antibiotics. In view of this, the nature or type of the surfactant must be determined by a person skilled in the art for each single case.

The invention will now be disclosed more in detail in connection with the accompanying drawing, which schematically shows a liquid extraction plant for carrying into effect a specially preferable method according to the invention.

The plant shown in the drawing comprises an extraction apparatus 1, a so called mixer-settler, having a mixing chamber 2 and a chamber 3, 3a for the heavier phase which is in this case the aqueous solution, and 3b for the lighter phase, which is in this case the organic solution. Furthermore, the plant contains a re-extraction apparatus 5, which is also of a mixer-settler type having a mixing chamber 6 and a chamber 7, 7a for the heavier phase and 7b for the lighter phase. Both mixing chambers 2 and 6 contain stirrer 9 and 10, respectively. The extraction apparatus 1 is provided with a feeding conduit 11 and a discharging conduit 12 for the aqueous solution, and similarly the re-extraction apparatus 5 is provided with a feeding conduit 13 and a discharging conduit 14. Between the light-phase part 3b of the extraction apparatus 1 and the mixing chamber 6 of the re-extraction apparatus 5 there is a conduit 15 and from the light-phase part 7b of the re-extraction apparatus 5 a recycling conduit 16 leads to the mixing chamber 2 of the extraction apparatus 1. Furthermore there is a recycling conduit 17 between the feeding and discharging conduits 13 and 14, respectively, of the re-extraction apparatus 5.

Moreover, in the recycling conduit 17 between the feeding and discharging conduits 13 and 14, respectively, of the re-extraction apparatus 5 there is a flocculating tank/container 20, provided with a discharging conduit 21. To the flocculating tank/container 20 flocculating or precipitating agents from a container 22 can be added through the conduit 23.

The extraction method is performed by feeding the aqueous feed solution, from which dissolved materials are to be extracted and which contains extractable surfactants, added in order to prevent an agglomeration of solid particles, through the conduit 11 to the mixing chamber 2, which already contains an organic solution.

After a sufficient mixing in the mixing chamber 2 the mixture of aqueous solution and organic solution is allowed to separate, the heavier aqueous solution being accumulated in the heavy-phase part 3a, while the lighter organic solution, into which dissolved materials have been extracted, is accumulated in the light-phase part 3b. The treated aqueous solution, which is depleted of dissolved materials, is discharged through the conduit 12 together with the solid particles, and the organic solution is transferred via the conduit 15 to the mixing chamber 6 of the re-extraction apparatus 5. An aqueous washing solution is fed to last-mentioned chamber via the conduit 13 and after a mixing operation in the chamber 6, wherein dissolved materials are transferred into the washing solution, the separation is performed. In this way there is obtained in the light-phase part 7b an organic solution depleted of dissolved materials, which is recycled via the conduit 16 to the extraction apparatus 1, and in the heavy-phase part 7a an aqueous product solution which contains said dissolved materials, preferably in a higher concentration than in the aqueous feed solution fed through the conduit 11. Thus, a concentration can be obtained by maintaining a lower flow of washing solution fed through the conduit 13 than the flow of feed solution fed through the conduit 11.

The aqueous product solution is discharged through the conduit 14, while part thereof is recycled via a conduit 17a, the flocculating tank/container 20 and the conduit 17b to the washing solution fed through the conduit 13. In the flocculating tank/container 20 the surfactants present in the product solution are contacted with a flocculating or precipitating agent from the container 22, whereupon the flocculated materials are discharged through the conduit 21, while the solution freed from flocculated materials is recycled to the re-extraction apparatus 5 via the conduit 17b. Analogously the surfactants can be removed from the product solution by filling the flocculating tank/container 20 with a solid adsorption material. The surfactants are eluted with a solution from the container 22.

Through the presence of special surfactants in the aqueous feed solution it has unexpectedly turned out possible to eliminate the crud problem without having any adverse effect of the surfactants on the separation, i.e. without having any prohibitive emulsions, in the extraction step. Furthermore, in spite of the fact that a certain portion of the surfactants are transferred via the organic solution to the re-extraction apparatus 5 and also partly is retained and accumulated in the liquid extraction plant, partly by the recycling of the organic solution in the conduit 16, partly by the recycling of the product solution in a conduit 17, it has shown possible, according to the invention, to avoid adverse effects, especially formations of emulsions also in the re-extraction step. Thus, in accordance with the present invention this is accomplished by removing the surfactants in the flocculating tank/container 20. Of course, this flocculating tank/container 20 can also be arranged in direct connection with the re-extraction apparatus 5, so as to remove the surfactant from the product solution before said solution is divided into two flows, of which one is discharged directly through the conduit 14 and the other is recycled via the conduit 17.

EXAMPLE 1

A waste solution from a manufacture of rayon contains i.a. 200 mg/l of zinc, 3 g/l of sulfuric acid and 10 g/l of sodium sulfate. Furthermore, it contains cationic surfactants in an amount of up to 500 mg/l and solid substances in the form of hemi-cellulose of different degrees of degradation, colloidal sulfur, zinc sulfide and "soil" in an amount of about 150 mg/l. The prevailing content of cationic surfactants is composed of several compounds, but the analysis refers to the total cation activity.

From said waste solution zinc is removed by means of an organic solution containing 10% of di(2-ethylhexyl)-phosphoric acid in kerosine in a liquid extraction plant consisting of an extraction step and a re-extraction step. The formation of crud is very slight due to the fact that the solid substances are prohibited to agglomerate through the cationic surfactants. To some extent these surfactants are extractable to the organic solution. They are also washed away from the organic solution into the product solution in the re-extraction step.

In order to remove the cationic surfactants so that their contents in the liquid extraction system will not be so high as to cause a formation of emulsions, the product solution is passed through a bed of activated carbon. By means of adsorption the amount of cationic surfactants in the product solution can be reduced from 100 mg/l to 10 mg/l through a contact of about 15 minutes with the activated carbon. The product solution, which in this way has been depleted of cationic surfactants, is recycled to the re-extraction step as a washing solution.

EXAMPLE 2

According to the same method as in Example 1 a product solution is obtained which contains cationic surfactants. In order to remove said surfactants a hot (about 50° C.) solution of the sodium salt of lauryl sulfuric acid is added to the product solution in a flocculating tank. In some conditions this surfactant is an anionical surfactant. At the contact with the strongly acid and colder product solution the lauryl sulfuric acid is precipitated as a floc since the solubility thereof in the solution is low. The cationic surfactants in the product solution are adhered to the floc and the floc together with cationic surfactants can be skimmed off. When the product solution contains 100 mg/l of cationic surfactants, their contents will in this way be reduced to 15 mg/l by adding 100 mg/l of sodium lauryl sulfate and skimming the formed floc off.

EXAMPLE 3

From a waste solution from the manufacture of antibiotics zinc is removed in a liquid extraction plant. The waste solution contains i.a. 1 g/l of zinc, about 500 mg/l of polyoxypropylene-polyoxyethylene adduct (of the Pluronic type), a non-ionic surfactant and solid substances in the form of carbohydrates, cellulose, bacteria and inorganic materials to a content of about 500 mg/l. The pH is 5–7.

In the extraction step the zinc is transferred from the aqueous waste solution into an organic solution consisting of 2% di-(2-ethylhexyl)phosphoric acid in kerosine. At the same time the non-ionic surfactant is extracted. There is no accumulation of solid substances in the form of crud.

The organic solution is washed in the re-extraction step with a washing solution containing 500 g/l of sulfuric acid. In this way the zinc is transferred from the organic solution into the product solution. Also the non-ionic surfactant is transferred into the strongly acid product solution. However, in said solution a destruction thereof takes place and the residues are removed with the product solution. In this way, the anionic surfactant can be removed such that the amount thereof in the liquid extraction system will not be so high as to cause a formation of prohibitive emulsions.

What is claimed is:

1. A method of removing by means of a liquid extraction, dissolved materials, preferably metal ions, from an aqueous feed solution containing extractable surfactants, which comprises:
   (a) contacting in at least one extraction step, the aqueous feed solution with an organic solution so as to partly extract the materials into the organic solution, the extraction being performed in the presence of the surfactants;
   (b) contacting in at least one re-extraction step, the organic solution, containing extracted materials, with an aqueous washing solution so as to transfer the materials from the organic solution into the washing solution, to the formation of:
      (i) an aqueous product solution, which is recovered while partially being recycled as the washing solution, and
      (ii) an organic solution depleted of said materials, which is recycled to the extraction step; and
   (c) removing the surfactants in connection with the re-extraction step, at least from that part of the product solution which is recycled as the washing solution.

2. A method according to claim 1, wherein the surfactants are removed by contacting the product solution with an agent selected from the group consisting of an adsorption agent, a precipitation agent or a flocculation agent and then removing in a manner known per se, the adsorbed, precipitated and flocculated substances, respectively.

3. A method according to claim 1, wherein the surfactants are removed by destruction thereof.

4. A method according to claim 2, wherein the product solution is contacted with activated carbon.

5. A method according to claim 2, wherein the product solution is contacted with a solid floc, the character of charge of which is opposite to that of the surfactants.

6. A method according to claim 3, wherein the surfactants are destructed by contacting them with a washing solution containing a strong acid.

* * * * *